United States Patent
Nakayama

(10) Patent No.: US 7,534,529 B2
(45) Date of Patent: May 19, 2009

(54) NEGATIVE ELECTRODE AND NICKEL-METAL HYDRIDE STORAGE BATTERY USING THE SAME

(75) Inventor: Soryu Nakayama, Atsugi (JP)

(73) Assignee: Panasonic Corporation, Osaka (JP)

( * ) Notice: Subject to any disclaimer, the term of this patent is extended or adjusted under 35 U.S.C. 154(b) by 812 days.

(21) Appl. No.: 11/139,531

(22) Filed: May 31, 2005

(65) Prior Publication Data

US 2006/0024580 A1    Feb. 2, 2006

(30) Foreign Application Priority Data

Jul. 30, 2004    (JP) .............................. 2004-223185

(51) Int. Cl.
*H01M 4/58* (2006.01)
*H01M 4/62* (2006.01)

(52) U.S. Cl. .................................... 429/218.2; 429/232

(58) Field of Classification Search .............. 429/218.2, 429/232; 252/182.1
See application file for complete search history.

(56) References Cited

U.S. PATENT DOCUMENTS 6,284,409 B1 * 9/2001 Higashiyama et al. ... 429/218.2

2006/0194106 A1 * 8/2006 Nakayama et al. ....... 429/218.2

FOREIGN PATENT DOCUMENTS

| JP | 7-65826 | 3/1995 |
|---|---|---|
| JP | 11-111298 | 4/1999 |
| JP | 11-185745 | 7/1999 |

* cited by examiner

*Primary Examiner*—Stephen J. Kalafut
(74) *Attorney, Agent, or Firm*—Wenderoth, Lind & Ponack, L.L.P.

(57) ABSTRACT

A negative electrode of a nickel-metal hydride storage battery includes an active material layer formed on a conductive substrate and including a hydrogen storage alloy powder and a carbon powder. The carbon powder includes some carbon particles each containing at least one metal selected from a group consisting of Ni, Co, Ca, Fe, Mg, Mn, Ti, and V. Each of the some carbon particles include a particle containing the above metal inside thereof. In this negative electrode, the carbon powder contains a metal therein. Thus, while maintaining excellent gas compatibility carbon material inherently has, the carbon powder has improved conductivity as a conductive agent. Therefore, the use of the negative electrode including a hydrogen storage alloy can provide a nickel-metal hydride storage battery that can prevent an excessive increase in its inner pressure, and has excellent high-current discharge characteristics.

9 Claims, No Drawings

NEGATIVE ELECTRODE AND NICKEL-METAL HYDRIDE STORAGE BATTERY USING THE SAME

BACKGROUND OF THE INVENTION

1. Field of the Invention

The present invention relates to a nickel-metal hydride storage battery and particularly to an improvement in its negative electrode essentially consisting of a hydrogen storage alloy.

2. Background Art

The nickel-metal hydride storage battery that uses a negative electrode including a hydrogen storage alloy is widely used as a power source for various kinds of wireless devices or electronic devices, such as telecommunication equipment and personal computers, because it is more eco-friendly and has higher energy density than the conventional nickel-cadmium storage battery. Further, the nickel-metal hydride storage battery is also used in an electric power tool or electric car for which high-current charge/discharge is essential. Because applications of the nickel-metal hydride storage battery are expanding as described above, further improvements in its charge/discharge characteristics are desired.

A description is provided of a process of manufacturing a conventional negative electrode including a hydrogen storage alloy. First, a binder, e.g. polytetrafluoro-ethylene, and styrene-butadiene rubber, and a viscosity improver, e.g. methyl cellulose, carboxyl methyl cellulose, and polyvinyl alcohol, are added to a pulverized hydrogen storage alloy powder, to prepare a mixture. Next, the mixture is kneaded with water, to provide a paste. Thereafter, the paste is applied to a punching metal, i.e. a core material, dried and pressed.

For a negative electrode made of a paste type hydrogen storage alloy manufactured as above, coating the surface of the hydrogen storage alloy powder in the negative electrode with a binder is likely to decrease the conductivity between the hydrogen storage alloy particles. When the conductivity decreases, an increase in the rate of hydrogen storage alloy particles uninvolved in charge/discharge increases the inner pressure of the battery during overcharge, and decreases the high-current discharge characteristics. This poses a problem of decreasing the cycle life of the battery.

To address the above problem, the following prior arts are disclosed. In the method described in Japanese Patent Unexamined Publication No. H11-185745, carbon powder is added to the negative electrode as a conductive agent. The addition of carbon powder increases the conductivity between hydrogen storage alloy particles, and the effect of excellent gas compatibility carbon material inherently has promotes gas consumption reaction of the negative electrode. These effects can alleviate an increase in the inner pressure of the battery and increase the high-current discharge characteristics to some degrees. However, because the conductivity of carbon powder is insufficient the effects of inhibiting an increase in the inner pressure, and an improvement in the high-current discharge characteristics are not sufficient.

In the method described in Japanese Patent Unexamined Publication No. H11-111298, metal coated carbon powder in which a metal is coated on at least a part of the surface of a carbon particle is added. High conductivity of the metal coating the surface of carbon particles can increase the conductivity of the negative electrode, improve the high-current discharge characteristics, and inhibit an increase in the inner pressure of the battery. However, the metal coating inhibits the excellent gas compatibility carbon material inherently has, and thus the effect of inhibiting an increase in the inner pressure of a battery is small. This phenomenon is conspicuous particularly when the coating area is large. In contrast, when the coating area is too small, the difference from ordinary carbon powder is small, and the effect of improving the battery characteristics is difficult to obtain.

Japanese Patent Unexamined Publication No. H07-65826 discloses a method of adding nickel powder containing 0.2 to 3 wt % of carbon. This method prevents oxygen from oxidizing the negative electrode, and improves the conductivity between the hydrogen storage alloy particles. This can inhibit an increase in the inner pressure of the battery, and improve the high-current discharge characteristics. However, because the main body of the additive is a metal powder, the effect of the excellent gas compatibility carbon material inherently has is not fully exercised, and thus inhibition of an increase in the inner pressure of the battery must be improved.

In the above prior arts, although the conductivity of the negative electrode including a hydrogen storage alloy may be improved, the degree of improving the conductivity and electrode reaction are insufficient. Therefore, the effects of inhibiting an increase in the inner pressure of the battery and improving the high-current discharge characteristics are also insufficient.

SUMMARY OF THE INVENTION

To address the above problems, a negative electrode of a nickel-metal hydride storage battery of the present invention includes an active material layer formed on a conductive substrate and including a hydrogen storage alloy powder and a carbon powder. The carbon powder includes some carbon particles each containing at least one metal selected from a group consisting of Ni, Co, Ca, Fe, Mg, Mn, Ti, and V. Each of the some carbon particles include a particle containing the metal inside thereof. In the negative electrode of the present invention, the carbon powder, i.e. a conductive agent, contains a conductive metal therein. Thus, while maintaining excellent gas compatibility carbon material inherently has, the carbon powder has improved conductivity as a conductive agent. Therefore, the use of the negative electrode including a hydrogen storage alloy of the present invention can provide a nickel-metal hydride storage battery that can prevent an excessive increase in its inner pressure and has excellent high-current discharge characteristics.

DESCRIPTION OF THE INVENTION

An exemplary embodiment of the present invention is described hereinafter.

A negative electrode including a hydrogen storage alloy of the present invention is a negative electrode used in a nickel-metal hydride storage battery. In the negative electrode, a conductive substrate carries an active material layer made of a mixture of a hydrogen storage alloy powder, binder, and carbon powder, i.e. a conductive material. The carbon powder contains at least one metal selected from a group consisting of Ni, Co, Ca, Fe, Mg, Mn, Ti, and V, and some particles each containing at least one selected metal therein.

One example of manufacturing the negative electrode including a hydrogen storage alloy of the present invention is described below. First, a hydrogen storage alloy powder, carbon powder, and binder are kneaded with pure water, to prepare a paste. The paste is applied to a conductive substrate, dried, and rolled.

The structure of the hydrogen storage alloy is not specifically limited. It is preferable to use $AB_5$-type alloys having a $CaCu_5$ type structure, $AB_2$-type alloys having a Laves structure ($MgCu_2$ type or $MgZn_2$ type), AB-type alloys having a CsCl type structure, or $A_2B$-type alloys having a $Mg_2Ni$ type structure.

In a hydrogen storage alloy of the present invention, carbon powder contains at least one metal selected from a group consisting of Ni, Co, Ca, Fe, Mg, Mn, Ti, and V, and the selected metal is contained in some particles constituting the carbon powder. Incidentally, it is not essential that every particle constituting the carbon powder contains the metal therein. At least a part of the particles may contain the metal therein. Further, some carbon particles may contain the metal on the surface of each particle. Only one kind of the above metals can be contained in one carbon particle, or all the eight kinds of metals can be contained in one carbon particle.

Hereinafter, a description is provided of a method of producing a metal-containing carbon powder by an oil furnace process, a known incomplete combustion process, for example. In the incomplete combustion process, aromatic hydrocarbon oil with a predetermined amount of predetermined metal elements added thereto is used as oil as starting material. Fuel and air are introduced into a refractory production furnace resistant to a heat of approximately 2,000° C., and the fuel is completely combusted to increase the temperature of the furnace to approximately 1,800° C. Next, the liquid oil as the starting material containing the metal elements is continuously sprayed onto a reaction part of high temperatures in the furnace. Further, after collection, classification, pulverization steps, a metal-containing carbon powder can be obtained. The particle diameter of the carbon powder can be controlled by controlling the conditions of temperature, time, and pulverization.

In a hydrogen storage alloy of the present invention, it is preferable that the metal content in the carbon powder ranges from 0.001 to 1.50 wt %. When the metal content is too small, the conductivity of the carbon powder does not improve sufficiently. In contrast, when the metal content is too large, the metal is difficult to be contained in the carbon powder.

It is also preferable that the amount of dibutyl phthalate absorbed in the carbon powder (hereinafter referred to as DBP absorption value) is at least 400 ml/100 g. When the DBP absorption value is smaller than 400 m/100 g, the conductivity of the carbon powder does not improve sufficiently. The DBP absorption value is an amount of DBP for filling voids of carbon powders and is an index showing contacts between carbon particles or state of a structure affected by flocculation of particles.

It is also preferable that the specific surface area of the carbon powder ranges from 1,000 to 5,000 $m^2/g$. When the specific surface area is smaller than 1,000 $m^2/g$, it is difficult that the carbon powder enhances the reactivity of the hydrogen storage alloy. As a result, an increase in the inner pressure during overcharge increases. On the other hand, when the specific surface area exceeds 5,000 $m^2/g$, the carbon powder easily captures the binder, and this affects the strength of the electrode. As a result, peeling of the active material layer from the conductive substrate or falling off of hydrogen storage alloy powder is likely to occur.

It is also preferable that the bulk density of the carbon powder ranges from 0.05 to 0.09 $g/cm^3$. When the bulk density is smaller than 0.05 $g/cm^3$, the viscosity of a paste including the carbon powder is too large, and thus the preparation of the paste is difficult. On the other hand, when the bulk density is larger than 0.09 $g/cm^3$, the degree of flocculation of the carbon powder increases, and thus dispersion thereof in the electrode is not uniform. As a result, the conductivity of the electrode plate decreases.

It is also preferable that the carbon powders are agglomerated carbon particles (or secondary particles) in which primary particles flocculate, the average particle diameter of the primary particle ranges from 5 to 30 nm, and the average particle diameter of agglomerated carbon particles ranges from 5 to 20 μm. When the average particle diameter of the primary particles is larger than 30 nm, formation of a chain structure for ensuring the conductivity is insufficient. As a result, the conductivity of the carbon powder does not improve sufficiently. On the other hand, when the average particle diameter of the primary particles is smaller than 5 nm, the conductivity of the carbon powder improves sufficiently. However, production conditions are stricter, and thus production of the carbon powder is more difficult. When the average particle diameter of the agglomerated carbon particles is larger than 20 μm, dispersion in the electrode plate is not uniform. As a result, the conductivity of the electrode plate cannot improve sufficiently. On the other hand, the average particle diameter of the agglomerated carbon particles is smaller than 5 μm, the conductivity of the carbon powder can sufficiently improve; however, the viscosity of the paste is too large. As a result, the production of the electrode plate is more difficult.

It is also preferable that the amount of the carbon powder to be added ranges from 0.1 to 1.0 part by weight with respect to 100 parts of the hydrogen storage alloy. When the amount is smaller than 0.1 parts by weight, the electrical continuity between hydrogen storage alloy particles decreases. On the other hand, when the amount is larger than 1.0 part by weight, the amount of the hydrogen storage alloy per unit volume of the electrode decreases and thus the capacity of the electrode decreases.

Setting the above conditions can provide a carbon powder having high conductivity and suitable for electrode production. Addition of this carbon powder to a negative electrode including a hydrogen storage alloy can decrease the contact resistance between the hydrogen storage alloy particles. This allows the alloy throughout the electrode to contribute to the electrode reaction, thus improving the charge/discharge characteristics of the electrode. Further, addition of this carbon powder allows the gas compatibility effect carbon powder inherently has to fully be exerted, thus increasing the gas absorbing capability of the negative electrode including a hydrogen storage alloy.

In other words, the use of an electrode including a hydrogen storage alloy of the present invention allows designing a nickel-metal hydride storage battery that inhibits an increase in its inner pressure during overcharge and high-current charge and has excellent high-current charge/discharge characteristics.

A detailed description of this exemplary embodiment is provided hereinafter with reference to some examples. The present invention is not limited to the following examples.

EXAMPLE 1

In Example 1, a method of manufacturing a negative electrode including a hydrogen storage alloy is described. First, a hydrogen storage alloy having a composition represented by $MmNi_{3.55}Co_{0.75}Mn_{0.4}Al_{10.3}$ is pulverized by a ball mill, to provide particles having an average particle diameter of 24 μm. Next 100 parts by weight of this hydrogen storage alloy powder, 0.15 parts of carboxyl methyl cellulose, 0.3 parts of carbon black (i.e. carbon powder), and 0.8 parts of styrene-butadiene copolymer are mixed with water, i.e. a dispersing media, to prepare a hydrogen storage alloy paste. Now, carboxyl methyl cellulose is a viscosity improver, carbon black is a conductive agent, and styrene-butadiene copolymer is a binder. This paste is applied to a punching metal, i.e. a substrate, dried, and rolled. The rolled material is cut into pieces each 0.33 mm thick, 3.5 cm wide, and 31 cm long, to produce negative electrode plates a1 to a8 each including the hydrogen storage alloy in Example 1. In some cases, negative electrode plates a1 to a8 are generically referred to as negative electrodes "a" hereinafter.

Carbon powder including each metal element that functions as a conductive agent is produced by the incomplete combustion, process. The content of each metal is shown in Table 1.

Element distribution in the section of produced each carbon powder was analyzed by an electron prove microanalysis (EPMA). Existence of a metal element inside of each powder was confirmed.

The property values of the produced carbon powder are as follows.

The amount of absorbed oil was measured with C. W. Brabender's Absorpmeter E type, according to JIS K 6217. The DBP absorption value measured ranges from 415 to 425 ml/100 g. The specific surface area was measured with Shimadzu's ASAP 2000 specific surface area measuring device by gas adsorption operation. The specific surface area measured ranges from 2,000 to 2,200 $m^2/g$. The average particle diameter was measured with Shimadzu's SALD-2001 laser particle-size distribution measuring device by laser diffractometry. The average particle diameter measured ranges from 10 to 13 μm. Further, the average particle diameter of the primary particles was measured with JEOL's JSM-5900LV electron microscope. The average particle diameter of the primary particles measured ranges from 10 to 15 nm. The bulk density measured with a bulk density measuring device ranges from 0.06 to 0.07 $g/cm^3$.

Next, nickel-metal hydride batteries A1 to A8 were produced using negative electrode plates a1 to a8. First, each of negative electrode plates "a" was combined with a positive electrode and a separator, and wound into a spiral shape, to form an electrode group. Current collectors for the positive electrode and negative electrode "a" were formed in predetermined positions. The components were housed into a battery case of an SC size. In Example 1, for the positive electrode, a known paste type nickel positive electrode plate (3.5 cm wide, 26 cm long, and 0.57 mm thick) was used. For the separator, unwoven fabric made of polypropylene modified with hydrophilic groups was used. For an electrolyte, lithium hydroxide was dissolved in a potassium hydroxide aqueous solution having a specific gravity of 1.30 in a ratio of 40 g/l.

After the electrode group was housed in the case, the top portion of the case was sealed with a sealing plate. Thus, nickel-metal hydride storage batteries A1 to A8 each having a nominal capacity of 3,000 mAh of the present invention were produced. In some cases, batteries A1 to A8 are generically referred to as batteries A hereinafter.

For comparison, nickel-metal hydride storage battery B in which only the carbon powder added to the negative electrode plate is different from those of batteries A was produced (hereinafter referred to as battery B). In other words, the carbon powder used for battery B does not contain any metal element.

TABLE 1

| Battery | Electrode plate | Contained metal | Content (wt %) | Inner pressure (Mpa) | Discharge capacity ratio (%) *1 | Average discharge voltage (V) *1 |
|---|---|---|---|---|---|---|
| A1 | a1 | Ni | 0.05 | 0.65 | 90 | 1.05 |
| A2 | a2 | Co | 0.05 | 0.69 | 90 | 1.06 |
| A3 | a3 | Ca | 0.05 | 0.78 | 88 | 0.97 |
| A4 | a4 | Fe | 0.05 | 0.76 | 86 | 0.94 |
| A5 | a5 | Mg | 0.05 | 0.75 | 85 | 0.94 |
| A6 | a6 | Mn | 0.05 | 0.69 | 89 | 1.02 |
| A7 | a7 | Ti | 0.05 | 0.68 | 90 | 1.03 |
| A8 | a8 | V | 0.05 | 0.73 | 87 | 0.96 |
| B | b | — | — | 0.98 | 70 | 0.85 |

*1 Characteristic values during high-current discharge

EXAMPLE 2

Next, influence of a change in the metal content in carbon powder added to a negative electrode plate on the battery characteristics was examined. In Example 2, Ni content in the carbon powder was changed. According to a method described in Example 1, as shown in Table 2, negative electrode plates c1 to c8 were produced. Each of electrode plates c1 to c8 includes a hydrogen storage alloy having different Ni content in carbon powder.

Thereafter, using electrode plates c1 to c8 as negative electrodes, enclosed type nickel-metal hydride storage batteries were produced according to the method described in Example 1. Respective batteries. are referred to as C1 to C8. In some cases, batteries C1 to C8 are generically referred to as batteries C hereinafter. Now, battery C4 is the same as battery A1 in Example 1.

Element distribution in the section of each carbon powder produced according to the method described in Example 1 was analyzed by the EPMA. As a result, existence of the Ni element inside of each carbon powder was confirmed.

The properties of the produced carbon powder are confirmed as follows. The DBP absorption value ranges from 415 to 425 ml/10 g. The specific surface area ranges from 2,000 to 2,200 $m^2/g$. The average particle diameter of secondary particles ranges from 10 to 13 μm. The average particle diameter of the primary particles ranges from 10 to 15 nm. The bulk density ranges from 0.06 to 0.07 $g/cm^3$.

TABLE 2

| Battery | Electrode plate | Metal Ni content (wt %) | Inner pressure (Mpa) | Discharge capacity ratio (%) *1 | Average discharge voltage (V) *1 |
|---|---|---|---|---|---|
| C1 | c1 | 0.0005 | 0.97 | 74 | 0.86 |
| C2 | c2 | 0.001 | 0.78 | 83 | 0.93 |
| C3 | c3 | 0.005 | 0.71 | 87 | 0.98 |
| C4 | c4 | 0.05 | 0.65 | 90 | 1.05 |
| C5 | c5 | 0.10 | 0.62 | 91 | 1.05 |
| C6 | c6 | 0.50 | 0.57 | 93 | 1.07 |
| C7 | c7 | 1.00 | 0.55 | 95 | 1.09 |
| C8 | c8 | 1.50 | 0.50 | 96 | 1.11 |

*1 Characteristic values during high-current discharge

EXAMPLE 3

In Example 3, battery characteristics were examined when the DBP absorption of Ni-containing carbon powder to be added to each negative electrode plate was varied by changing the reaction temperature and time, and pulverizing conditions. After negative electrode plates were produced under the same conditions as Example 1, electrode plates d1 to d8 each including the hydrogen storage alloy were produced using Ni-containing carbon powders having different DBP absorption.

Thereafter, using respective electrode plates d1 to d8 as negative electrodes, enclosed type nickel-metal hydride storage batteries were produced according to the method described in Example 1. Respective batteries are referred to as D1 to D8. In some cases, batteries D1 to D8 are generically referred to as batteries D hereinafter. Now, battery D4 is the same as battery A1 in Example 1.

Element distribution in the section of each carbon powder produced was analyzed by the EPMA. Existence of the Ni element was confirmed inside of each carbon powder.

The property values of the produced carbon powders are as follows. The DBP absorption is shown in Table 3. The specific surface area ranges from 2,000 to 2,200 m$^2$/g. The average particle diameter of secondary particles ranges from 10 to 13 μm. The average particle diameter of the primary particles ranges from 10 to 15 nm. The bulk density ranges from 0.06 to 0.07 g/cm$^3$.

TABLE 3

| Battery | Electrode plate | DBP absorption (ml/100 g) | Inner pressure (Mpa) | Discharge capacity ratio (%) *1 | Average discharge voltage (V) *1 |
|---|---|---|---|---|---|
| D1 | d1 | 385 | 0.98 | 74 | 0.86 |
| D2 | d2 | 400 | 0.79 | 85 | 0.94 |
| D3 | d3 | 411 | 0.70 | 88 | 0.99 |
| D4 | d4 | 420 | 0.65 | 90 | 1.05 |
| D5 | d5 | 432 | 0.60 | 92 | 1.06 |
| D6 | d6 | 439 | 0.56 | 94 | 1.06 |
| D7 | d7 | 441 | 0.54 | 96 | 1.08 |
| D8 | d8 | 450 | 0.50 | 96 | 1.11 |

*1 Characteristic values during high-current discharge

Evaluation of Battery Characteristics

After being assembled, batteries A of Example 1, battery B of Comparative example 1, batteries C of Example 2 were left at 25° C. for one day. Thereafter, two charge/discharge cycles were performed on the batteries. In one charge/discharge cycle, batteries are charged at 20° C. at 300 mA for 15 hours, and discharged at 600 mA until the terminal voltage of each battery reaches 1.0V. After initial activation of batteries A, B, and C were performed in this manner, the inner pressure characteristics and high-current discharge characteristics of the batteries were evaluated.

The inner pressure characteristics during overcharge were evaluated by charging the batteries at 20° C. at a current of 3,000 mA for 1.2 hours, and measuring the inner pressure of each battery.

The high-current discharge characteristics were evaluated using the average discharge voltage and discharge capacity ratio. In other words, (1) 10 charge/discharge cycles were performed on the batteries. In one charge/discharge cycle, the batteries are charged at 20° C. at 3,000 mA for 1.2 hours, and discharged at 3,000 mA until the terminal voltage of each battery reaches 1.0V. (2) Thereafter, the batteries were charged at 20° C. at 3,000 mA for 1.2 hours, and discharged at 30A until the terminal voltage of each battery reaches 0.8V. (3) The average discharge voltage was obtained during this high-current discharge.

The discharge capacity obtained when batteries are charged at 20° C. at 3,000 mA for 1.2 hours, and discharged at 600 mA until the voltage of each battery reaches 1.0V is set to 100%. Discharge capacity ratios during high-current discharge with respect to the above discharge capacity were obtained.

The inner pressure of each battery during overcharge, the discharge capacity ratio during high-current discharge, and the average discharge voltage during high-current discharge are shown in Tables 1 and 2.

As obvious from Table 1, for each of batteries A (A1 to A8), an increase in its inner pressure during overcharge is smaller than that of battery B of Comparative example 1. Additionally, batteries A have larger discharge capacity ratios and discharge voltages during high-current discharge than battery B.

The reason why each of batteries A has more excellent characteristics is based on the effects described in the exemplary embodiment. In other words, metal-containing carbon powder added to the negative electrode plate has high conductivity, and the contact resistance between hydrogen storage alloy particles decreases. Thus, during charge, hydrogen is easily stored in the alloy near the surface of the electrode plate. As a result, an excessively high inner pressure of the battery can be prevented during overcharge and high-current charge, and the battery exhibits excellent high-current charge/discharge characteristics.

In contrast, for battery B of Comparative example 1, insufficient conductivity of the negative electrode plate cannot provide sufficient gas consumption capability, and thus the high-current discharge characteristics are insufficient.

As shown in Table 2, it has been also confirmed that the content of the metal element has influence on the inner pressure of the batteries and the high-current discharge characteristics. In other words, as the content of the metal element increases, the conductivity of the negative electrode increases. This improves the high-current discharge characteristics and decreases the inner pressure of the battery. For this reason, when the content of the metal element is smaller than 0.001 wt %, the effect of improving conductivity is not exerted sufficiently. Therefore, the effects of inhibiting the inner pressure and improving the high-current charge/discharge characteristics are insufficient. On the other hand, when the content of the metal element exceeds 1.50 wt %, the effects of inhibiting the inner pressure of the battery and improving the high-current discharge characteristics are sufficiently exerted. However, it is difficult to contain the metal element in carbon powder. Based on the above results, it is desirable that the content of the metal element ranges from 0.01 to 1.50 wt %.

In this exemplary embodiment, Ni is used as a contained metal. However, using one of Co, Ca, Fe, Mg, Mn, Ti, and V instead of Ni can provide the similar effects. Additionally, using a carbon powder containing a mixture of a plurality of different metals can also provide the similar effects.

As shown in Table 3, as the DBP absorption increases, the conductivity of the negative electrode increases. This improves the high-current discharge characteristics and decreases the inner pressure of the battery. However, when the DBP absorption is smaller than 400 ml/100 g, the effect of conductivity cannot be exerted sufficiently. Thus, the effects of inhibiting the inner pressure and improving the high-current discharge characteristics are insufficient.

The present invention relates to a nickel-metal hydride storage battery and provides a battery that inhibits an increase in its inner pressure during overcharge and has excellent high-current discharge characteristics particularly by improving its negative electrode.

What is claimed is:

1. A negative electrode of a nickel-metal hydride storage battery comprising:
   an active material layer formed on a conductive substrate and including powder of a hydrogen storage alloy and a carbon powder;
   wherein the carbon powder includes some carbon particles each containing at least one metal selected from the group consisting of Ni, Co, Ca, Fe, Mg, Mn, Ti, and V inside thereof.

2. The negative electrode of claim 1, wherein a content of the metal in the carbon powder ranges from 0.001 to 1.50 wt %.

3. The negative electrode of claim 1, wherein DBP absorption value of the carbon powder is at least 400 ml/100 g.

4. The negative electrode of claim 1, wherein a specific surface area of the carbon powder ranges from 1,000 to 5,000 $m^2/g$.

5. The negative electrode of claim 1, wherein a bulk density of the carbon powder ranges from 0.05 to 0.09 $g/cm^3$.

6. The negative electrode of claim 1, wherein the carbon particles are agglomerated carbon particles in which primary particles flocculate, an average particle diameter of the primary particles ranges from 5 to 30 nm, and an average particle diameter of the agglomerated carbon particles ranges from 5 to 20 μm.

7. The negative electrode of claim 1, wherein an amount of the carbon powder contained in the electrode ranges from 0.1 to 1.0 part by weight with respect to 100 parts of the hydrogen storage alloy.

8. The negative electrode of claim 1, wherein the carbon powder is made by spraying aromatic hydrocarbon having the metal element added thereto in an atmosphere of 1,800° C.

9. A nickel-metal hydride storage battery having a negative electrode made of a hydrogen storage alloy, wherein
   the negative electrode comprises an active material layer formed on a conductive substrate and including powder of the hydrogen storage alloy and a carbon powder; and
   the carbon powder contains at least one metal selected from the group consisting of Ni, Co, Ca, Fe, Mg, Mn, Ti, and V, and the carbon powder includes some carbon particles containing the metal inside thereof.

* * * * *